United States Patent [19]

Gasper

[11] Patent Number: 5,781,815
[45] Date of Patent: Jul. 14, 1998

[54] CARTRIDGE HOLDER ATTACHABLE TO CAMERA

[75] Inventor: John Gasper, Hilton, N.Y.

[73] Assignee: Eastman Kodak Company, Rochester, N.Y.

[21] Appl. No.: 852,717

[22] Filed: May 7, 1997

[51] Int. Cl.[6] .................................................. G03B 17/24
[52] U.S. Cl. .......................... 396/422; 396/538; 396/544
[58] Field of Search .................................. 396/439, 511, 396/535, 538, 544, 419, 422

[56] References Cited

U.S. PATENT DOCUMENTS

| 3,608,458 | 9/1971 | Ratliff .................................. 396/326 |
| 4,406,385 | 9/1983 | Pribyl . |
| 5,175,576 | 12/1992 | Lancaster . |

*Primary Examiner*—David M. Gray
*Attorney, Agent, or Firm*—Roger A. Fields

[57] ABSTRACT

A cartridge holder for a film cartridge to be used with a camera of the type having a built-in support socket, such as a tripod socket, is characterized in that the cartridge holder includes a fastener configured to be received in the support socket to attach the cartridge holder directly to the camera.

8 Claims, 3 Drawing Sheets

CARTRIDGE HOLDER ATTACHABLE TO CAMERA

FIELD OF THE INVENTION

The invention relates generally to the field of photography, and in particular to a holder for a film cartridge that can be attached to a camera.

BACKGROUND OF THE INVENTION

Photographers are well aware of the possibility of running out of film during a picture-taking outing. For this reason, an extra roll of film is often carried in an accessory bag. Alternatively, a holder containing an extra roll of film can be secured to a carry strap for the camera.

SUMMARY OF THE INVENTION

According to the invention, a cartridge holder for a film cartridge to be used with a camera of the type having a built-in support socket, such as a tripod socket, is characterized in that:

the cartridge holder includes a fastener configured to be received in the support socket to attach the cartridge holder directly to the camera.

DETAILED DESCRIPTION OF THE INVENTION

Figure 1:
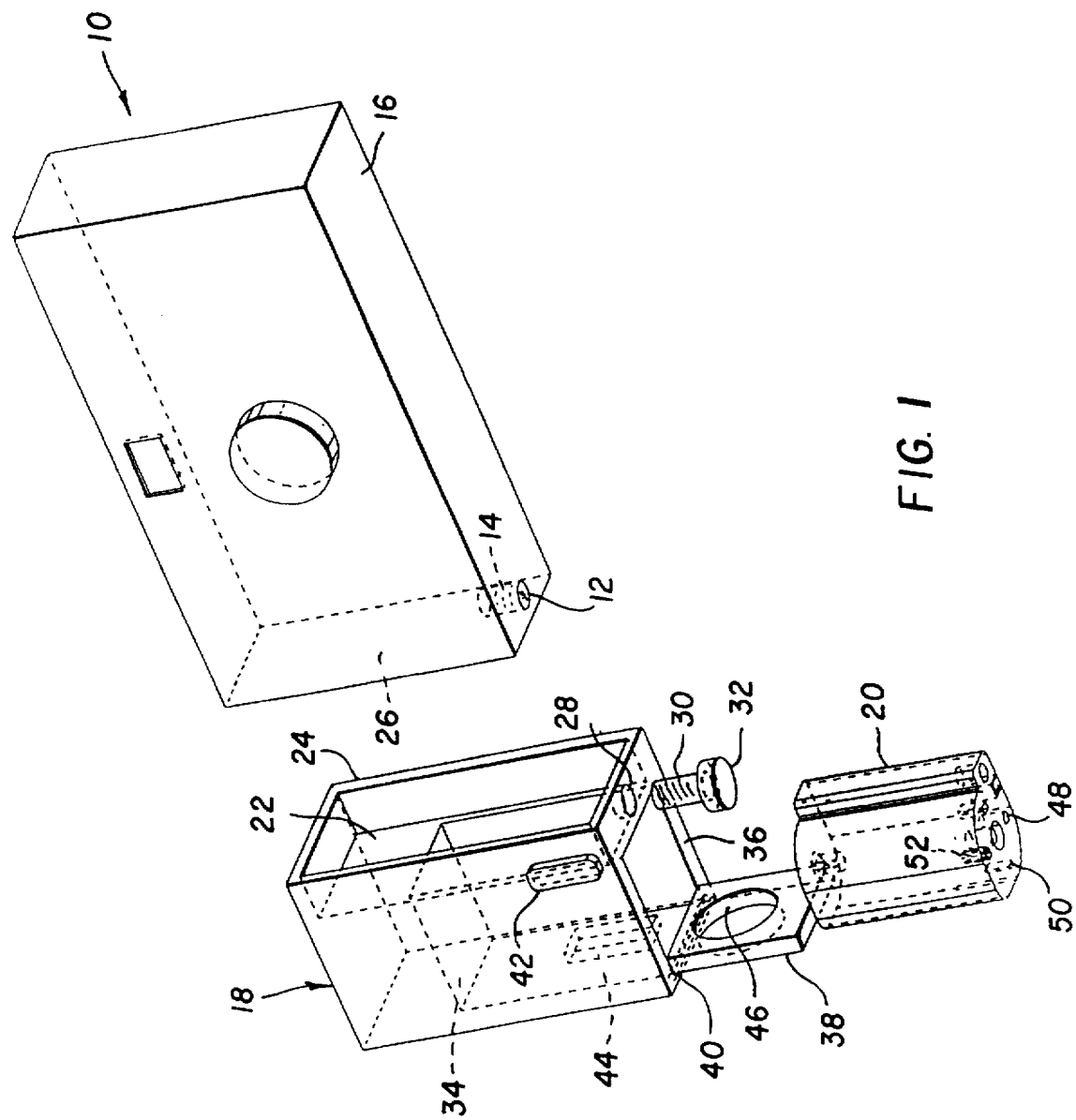
FIG. 1 is an exploded perspective view of a camera having a built-in tripod socket, and a cartridge holder for a film cartridge to be stored inside the cartridge holder, pursuant to a preferred embodiment of the invention.
Figure 2:
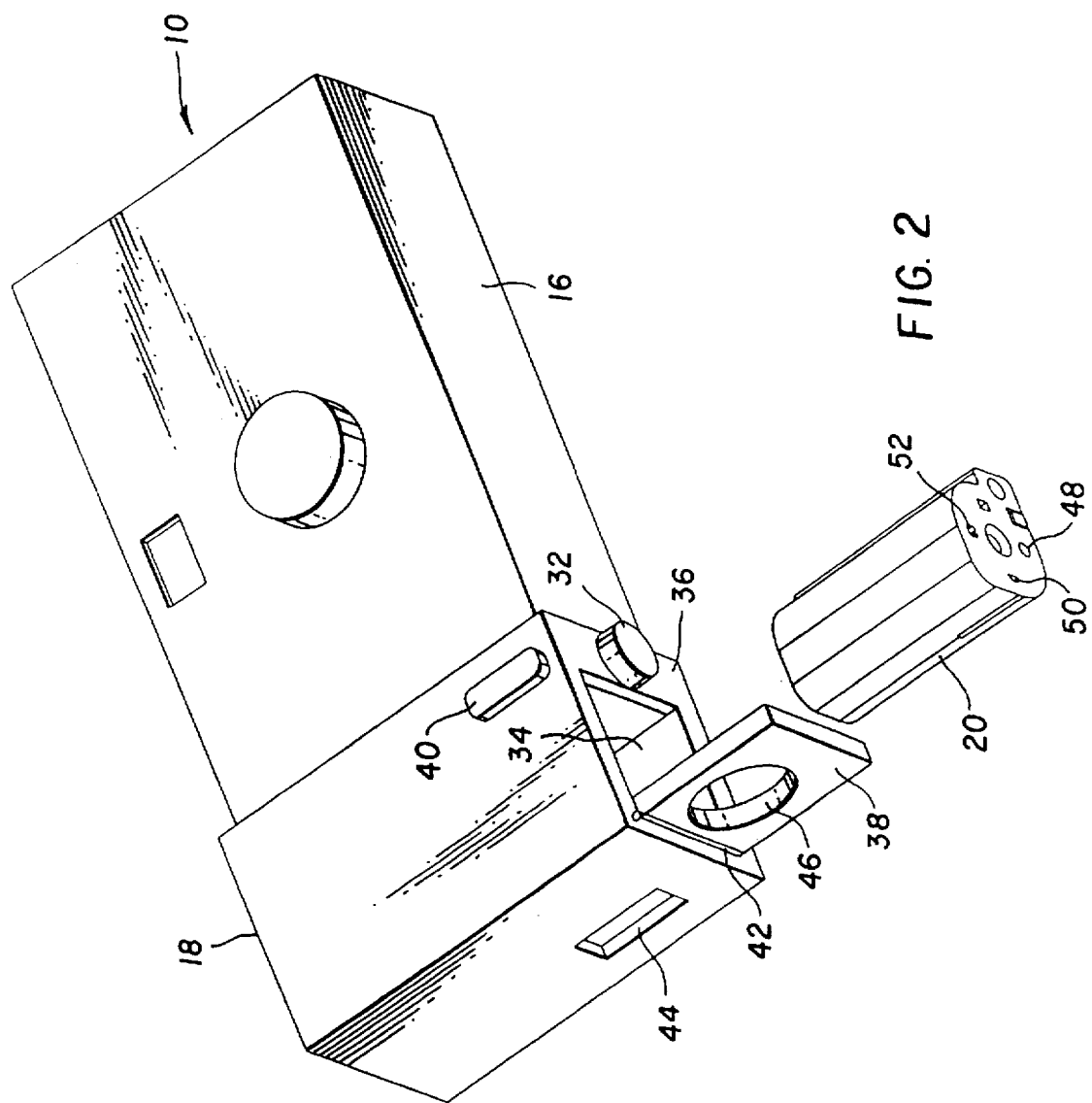
FIG. 2 is a perspective view similar to FIG. 1, showing the cartridge holder attached to the camera.

Referring now to the drawings, FIGS. 1 and 2 show a camera 10 having a built-in tripod socket 12, preferably a spirally grooved hollow cylinder 14, in a body 16 of the camera. A cartridge holder 18 for a known type film cartridge 20 has a chamber 22 that is open at one side 24 of the holder to receive a mating end 26 of the body 16. When the mating end 26 the body 16 is received in the chamber 22, a hole 28 in the holder 18 to the chamber is aligned with the tripod socket 12. This permits the photographer to insert a spirally grooved solid cylinder 30 of a thumbscrew 32 through the hole 28 and into the spirally grooved hollow cylinder 14 to fasten the holder 18 directly to the camera 10.

Figure 3:
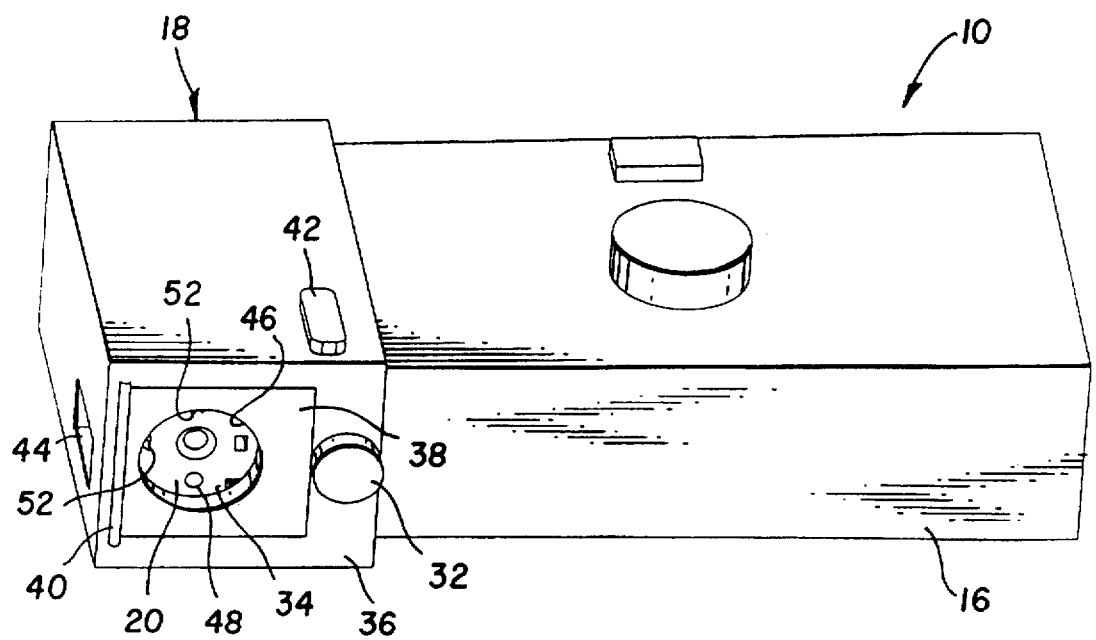
FIG. 3 is a perspective view similar to FIG. 2, showing a door of the cartridge holder closed with the film cartridge stored inside the cartridge holder.

The cartridge holder 18 has a chamber 34 that is open at a bottom end 36 of the holder to receive the film cartridge 20 as shown in FIGS. 2 and 3. A door 38 pivotally connected to the end 36 of the holder 18 at a hinge 40 is then closed. A manually movable latch 42 is movable to unlock the door 38 to permit the door to be pivoted open.

The cartridge holder 18 has a side window 44 for viewing a label (not shown) on the film cartridge 20 when the film cartridge is in the chamber 34. The label includes a printed indication of the film speed and the number of exposures available on the filmstrip in the film cartridge 20.

The holder 18 has a bottom window 46 in the door 38 for viewing a several film exposure status indicators 48, 50 and 52 on the film cartridge 20 for indicating whether the filmstrip is unexposed, partially exposed/unexposed or completely exposed.

The invention has been described with reference to a preferred embodiment. However, it will be appreciated that variations and modifications can be effected by a person of ordinary skill in the art without departing from the scope of the invention.

PARTS LIST 10. camera
12. tripod socket
14. spirally grooved hollow cylinder
16. body
18. cartridge holder
20. film cartridge
22. chamber
24. holder side
26. camera end
28. hole
30. spirally grooved solid cylinder
32. thumbscrew
34. chamber
36. holder end
38. door
40. hinge
42. latch
44. side window
46. bottom window
48. film exposure status indicator
50. film exposure status indicator
52. film exposure status indicator

What is claimed is:

1. A camera having a built-in support socket, and a cartridge holder for a film cartridge, are characterized in that:

said cartridge holder is configured to mate with said camera in order to permit the camera to make use of the film cartridge and includes a fastener configured to be received in said support socket to attach the cartridge holder directly to said camera when the cartridge holder mates with the camera.

2. A camera and a cartridge holder as recited in claim 1, wherein said fastener is a thumbscrew having a spirally grooved solid cylinder, and said support socket is a spirally grooved hollow cylinder into which said spirally grooved solid cylinder fits when the cartridge holder mates with the camera.

3. A camera and a cartridge holder as recited in claim 1, wherein said support socket is a tripod socket.

4. A camera and a cartridge holder as recited in claim 1, wherein said cartridge holder has a chamber that is open at one end of the cartridge holder to receive a film cartridge and a chamber that is open at one side of the cartridge holder to receive one end of said camera when the cartridge holder mates with the camera.

5. A cartridge holder for a film cartridge to be used with a camera of the type having a built-in support socket, is characterized in that:

said cartridge holder is configured to mate with the camera in order to permit the camera to make use of the film cartridge and includes a fastener configured to be received in the support socket to attach the cartridge holder directly to the camera when the cartridge holder mates with the camera.

6. A cartridge holder as recited in claim 5, wherein said cartridge holder has a chamber that is open at one end of the cartridge holder to receive a film cartridge and a chamber that is open at one side of the cartridge holder to receive one end of the camera when the cartridge holder mates with the camera.

7. A camera and a cartridge holder for a film cartridge, are characterized in that:

said cartridge holder has a chamber that is open at one end of the cartridge holder to receive a film cartridge and a chamber that is open at one side of the cartridge holder to receive one end of said camera.

8. A cartridge holder for a film cartridge to be used with a camera, is characterized in that:

said cartridge holder has a chamber that is open at one end of the cartridge holder to receive a film cartridge and a chamber that is open at one side of the cartridge holder to receive one end of the camera.

\* \* \* \* \*